(12) United States Patent
Schmitz

(10) Patent No.: US 10,526,044 B2
(45) Date of Patent: Jan. 7, 2020

(54) SHIFTING DEVICE AND SHIFTING PAWL FOR A SHIFTING DEVICE

(71) Applicant: Pinion GmbH, Denkendorf (DE)

(72) Inventor: Michael Schmitz, Niederelbert (DE)

(73) Assignee: PINION GMBH, Denkendorf (DE)

( * ) Notice: Subject to any disclaimer, the term of this patent is extended or adjusted under 35 U.S.C. 154(b) by 220 days.

(21) Appl. No.: 15/293,196

(22) Filed: Oct. 13, 2016

(65) Prior Publication Data

US 2017/0029067 A1 Feb. 2, 2017

Related U.S. Application Data

(63) Continuation of application No. PCT/EP2015/058066, filed on Apr. 14, 2015.

(30) Foreign Application Priority Data

Apr. 14, 2014 (DE) .................. 10 2014 105 313
Apr. 25, 2014 (DE) .................. 20 2014 101 968 U

(51) Int. Cl.
*F16D 41/26* (2006.01)
*B62M 11/06* (2006.01)
(Continued)

(52) U.S. Cl.
CPC ............ *B62M 11/06* (2013.01); *B62K 19/34* (2013.01); *F16D 41/26* (2013.01); *F16D 41/30* (2013.01)

(58) Field of Classification Search
CPC ................................ F16D 41/30; B62M 11/06
See application file for complete search history.

(56) References Cited

U.S. PATENT DOCUMENTS 1,642,107 A * 9/1927 Gaylord .................. F16D 11/12
192/71
2,846,039 A 8/1958 Requa et al.
(Continued)

FOREIGN PATENT DOCUMENTS

DE 102008064514 A1 7/2010
DE 102012200829 A1 7/2013
GB 619072 A 3/1949

OTHER PUBLICATIONS

International Preliminary Report on Patentability for International application No. PCT/EP2015/058066, dated Oct. 27, 2016, 17 pages.
(Continued)

*Primary Examiner* — William Kelleher
*Assistant Examiner* — Gregory T Prather
(74) *Attorney, Agent, or Firm* — Reising Ethington P.C.

(57) ABSTRACT

The present invention relates to a shifting device for a gearing unit, in particular for a vehicle driven using muscle force. The shifting device has a shaft for the mounting of a multiplicity of idler gears. A multiplicity of pawls are assigned to the idler gears and are movably mounted on the shaft in order to connect the idler gears rotationally conjointly to the shaft in at least one direction of rotation. A camshaft is assigned to the pawls and is designed to set different gear-speed stages of the gearing unit, wherein the pawls are assigned in each case one actuating element which is mounted so as to be movable relative to the camshaft and relative to the respective pawl and which is designed to actuate the pawl for the purposes of setting the gear-speed stages.

20 Claims, 14 Drawing Sheets

(51) Int. Cl.
*F16D 41/30* (2006.01)
*B62K 19/34* (2006.01)

(56) References Cited

U.S. PATENT DOCUMENTS

| | | | | |
|---|---|---|---|---|
| 5,553,510 | A * | 9/1996 | Balhorn | B62M 11/06 |
| | | | | 192/64 |
| 8,608,610 | B2 * | 12/2013 | Schmitz | B62M 11/06 |
| | | | | 475/207 |
| 8,992,375 | B2 | 3/2015 | Göbel et al. | |
| 2009/0241717 | A1 * | 10/2009 | Matsumoto | F16H 3/083 |
| | | | | 74/473.36 |
| 2013/0228995 | A1 * | 9/2013 | Serkh | B62M 11/145 |
| | | | | 280/261 |

OTHER PUBLICATIONS

International Search Report in English for International application No. PCT/EP2015/058066, dated Aug. 31, 2015, 5 pages.

\* cited by examiner

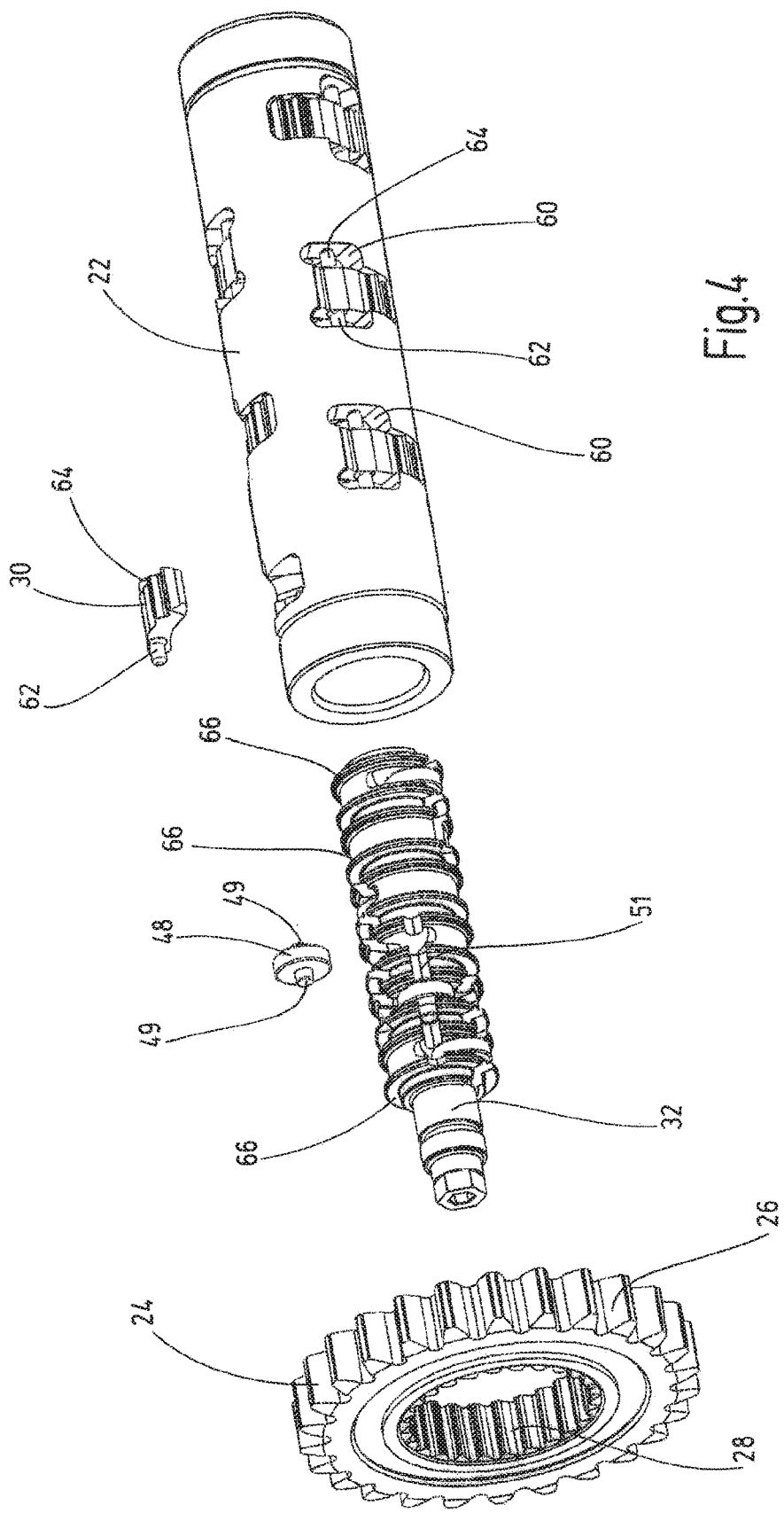

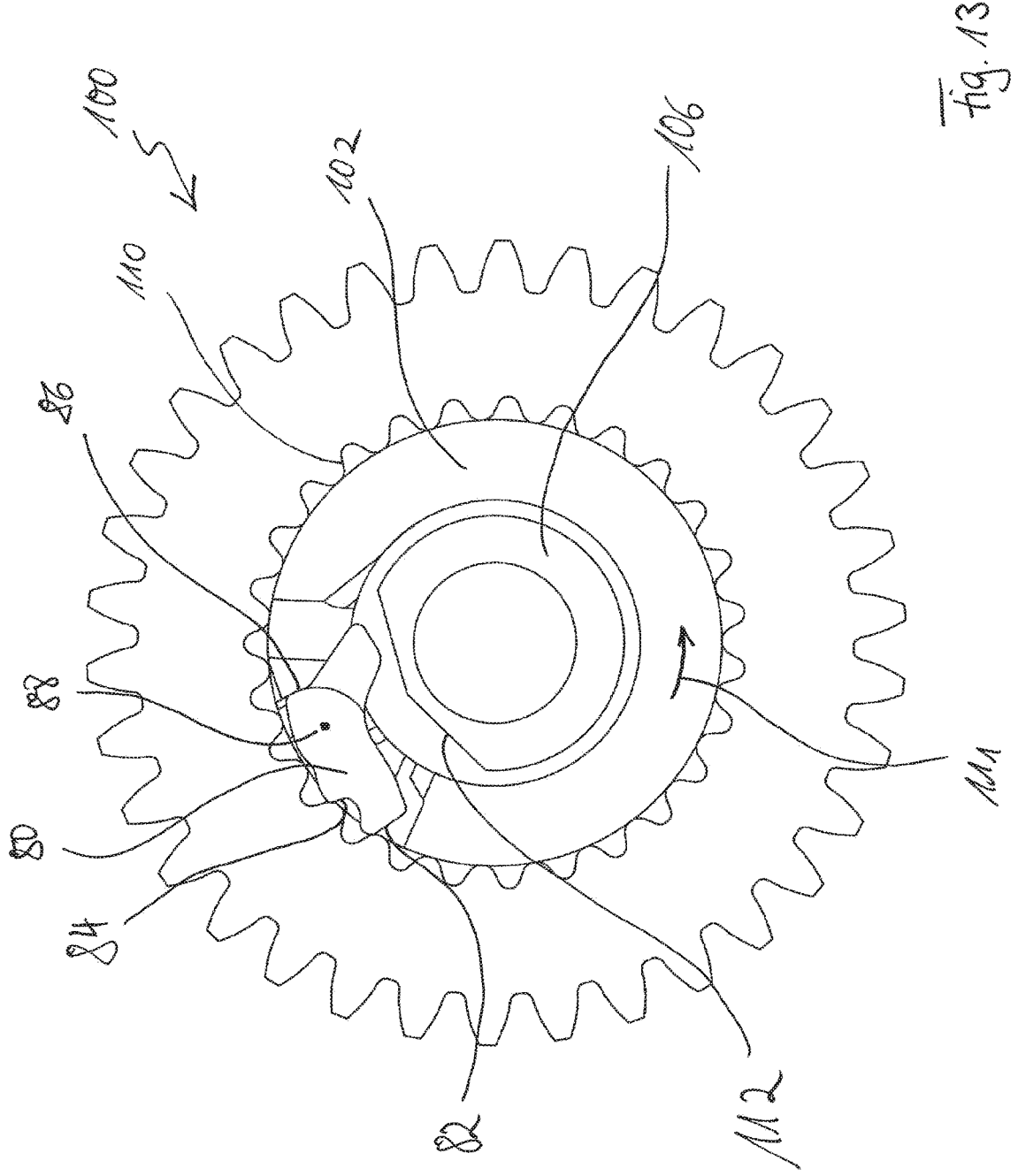

SHIFTING DEVICE AND SHIFTING PAWL FOR A SHIFTING DEVICE

CROSS-REFERENCE TO RELATED APPLICATIONS

This is a Continuation application of international patent application PCT/EP2015/058066, filed Apr. 14, 2015, which claims the priority of German patent applications DE 10 2014 105 313, filed Apr. 14, 2014 and DE 20 2014 101 968, filed Apr. 25, 2014.

BACKGROUND

The invention relates to a shifting device for a gearing unit, in particular for a vehicle driven using muscle force, having a shaft for the mounting of a multiplicity of idler gears, having a multiplicity of pawls which are assigned to the idler gears and which are movably mounted on the shaft in order to connect the idler gears rotationally conjointly to the shaft in at least one direction of rotation, and having a camshaft which is assigned to the pawls and which is designed to set different gear-speed stages of the gearing unit.

The present invention also relates to a pawl for a shifting device of a gearing unit, in particular for a gearing unit of a vehicle operated using muscle force, having a bearing section which is designed for movably mounting the pawl on a shaft, having a first engagement section which is arranged opposite the bearing section and which is designed to engage into an internal toothing of an idler gear, which is mounted on the shaft, in order to form a rotationally conjoint connection between the shaft and the idler gear in a first direction of rotation, and having an actuating section which is spaced apart from the bearing section and which is designed to transmit a force to the pawl in order to move the pawl.

Finally, the present invention relates to a gearing unit having a shifting device and having a pawl for the shifting device.

Shifting devices of said type and pawls of said type for shifting devices of gearing units serve for the transmission of drive force, in particular muscle force, with a speed increase ratio or speed reduction ratio and thereby for facilitating the driving of vehicles.

SUMMARY

It is an object of the present invention to provide an improved shifting device for a gearing unit in particular for a vehicle driven using muscle force, and to provide a pawl for a corresponding gearing unit, which pawl has a compact structural form and can at the same time be used for transmitting high loads.

Said object is achieved, in the case of the shifting device mentioned in the introduction, in that the pawls are assigned in each case one actuating element which is mounted so as to be movable relative to the camshaft and relative to the respective pawl in order to actuate the pawl for the purposes of setting the gear-speed stages.

Said object is achieved, in the case of the pawl mentioned in the introduction, in that a second engagement section is formed on the pawl, which second engagement section is spaced apart from the first engagement section and is designed to engage into the internal toothing of the idler gear.

By virtue of the fact that the pawls are mounted on the shaft for the purposes of connecting the idler gears rotationally conjointly to the shaft, the pawls correspondingly bear the drive force that is transmitted via the idler gears to the shaft or vice versa. The high drive force that acts on the pawls causes the pawls to be moved radially inward such that a correspondingly high friction force between the pawls and the camshaft must be overcome in order to move the camshaft relative to the pawls for the purposes of a gearchange. By virtue of the fact that the pawls are in each case assigned the movably mounted actuating element which is designed to actuate the pawls for the purposes of setting the gear-speed stages, the friction force between the pawls and the camshaft can be correspondingly reduced, such that a shifting process is possible with little expenditure of force and with correspondingly little technical outlay.

By virtue of the fact that a second engagement section is formed on the pawl, which second engagement section is spaced apart from the first engagement section, the pawl can correspondingly engage on two different teeth of the internal toothing of the idler gear mounted on the shaft, such that the force exerted on the pawl by the internal toothing can be distributed more uniformly. By way of this special shape, the pawls are generally more stable, such that either a greater force can be transmitted from the pawls to the idler gears, or else the same force can be transmitted with the same reliability with less usage of material.

Altogether, by way of the shifting device and the pawl, it is possible, with little technical outlay, to realize a more compact structural form with the same stability and the same load transmission capability.

This object of the present invention is thus achieved in its entirety.

In a preferred embodiment of the shifting device, the actuating elements are rotatably mounted.

In this way, with little technical outlay, it is possible to realize a low friction force between the pawls and the camshaft.

In a preferred embodiment, the actuating elements are mounted on the camshaft.

In this way, a torque imparted to the camshaft for the purposes of changing the gear-speed stages can be converted into a large force on the pawl, because the spacing between the actuating element and an axis of rotation of the camshaft is small.

It is furthermore preferable for the actuating elements to be mounted in each case on the pawls.

In this way, it is possible for the pawls to be actuated in a particularly precise manner, whereby, in particular, a synchronization of multiple gearing subsections and load alterations between the gearing subsections is possible in a precise manner.

In a preferred embodiment, the actuating elements have in each case one rolling body with a circumferential surface, which rolling bodies roll on the camshaft or on the pawl.

In this way, with little technical outlay, it is possible to realize low friction between the pawl and the actuating element, such that the camshaft can be rotated with little expenditure of force for the purposes of changing the gear-speed stages.

In a preferred embodiment, the actuating elements have at least one bearing section on which they are rotatably mounted, wherein a radius of the bearing section is smaller than a radius of the circumferential surface.

In this way, the friction force on the at least one bearing section can be reduced, because the circumferential surface has an improved lever ratio relative to the bearing section.

Here, the actuating element is preferably in the form of a roller element, and the bearing sections are preferably in the form of a bearing journal. The rolling element and the bearing journal are preferably formed in two pieces, that is to say from separate components.

In a preferred embodiment, the actuating elements and the camshaft are designed to move in each case one actuating section of the pawl outward in a radial direction.

In this way, the pawls can be actuated with little technical outlay, and the shaft can be correspondingly connected rotationally conjointly to the idler gears in said one direction of rotation.

It is furthermore preferable if the pawls are assigned in each case one spring element which is designed to move the pawls inward in a radial direction.

In this way, the pawls can be reliably released from the idler gears in order to release the rotationally conjoint connection to the idler gears.

In a preferred embodiment, the pawls have each case at least one engagement section which is designed to connect the shaft rotationally conjointly to the respective idler gear in said one direction of rotation.

In this way, it is possible with little technical outlay, and with a compact construction, for different gear-speed stages to be set by actuation of the respective pawl.

In a preferred embodiment, the pawls have in each case a multiplicity of engagement sections which are designed such that they can be simultaneously placed in engagement with in each case one tooth of the internal toothing of the respective idler gear.

In this way, the mechanical force that is exchanged between the internal toothing and the pawl can be better distributed, and load peaks can be avoided, because multiple engagement sections are in each case simultaneously in engagement with the internal toothing.

In a preferred embodiment, the pawls have in each case a multiplicity of engagement sections between which there is formed a gap, such that a tooth of an internal toothing of the respective idler gear can engage into the gap.

In this way, the mechanical force that acts on the pawl can be distributed more uniformly.

In a particular embodiment, the pawls have in each case three or more engagement sections which are designed such that they can be simultaneously placed in engagement with the internal toothing of the respective idler gear.

In this way, the mechanical force that acts on the pawl can be distributed even more uniformly.

Here, it is particularly preferable if the pawls have in each case one bearing surface, wherein the bearing surfaces are mounted in each case on a bearing section of the shaft about an axis of rotation.

In this way, the torque that is exchanged between the shaft and the idler gears can be transmitted by the pawls, and the pawls can be provided in a particularly compact structural form.

It is furthermore preferable for the spring elements to be mounted on the respective pawl in each case at an engagement point, wherein the engagement point is formed in each case between the first axis of rotation and the actuating section in a circumferential direction of the shaft.

In this way, the pawl can be pivoted outward with low spring force.

Here, it is particularly preferable if the engagement sections are in each case inclined such that the respective idler gear, in said one direction of rotation, exerts a force in an inward radial direction on the respective pawl.

In this way, in the absence of actuation by the respective actuating element, the force exerted by the internal toothing will cause the respective pawl to be automatically pivoted inward and disengaged from the internal toothing, such that a downshift is possible without an interruption in load.

Here, it is particularly preferable if the bearing section is inclined such that, in said one direction of rotation, a force is exerted inward in a radial direction on the bearing surface of the pawl.

In this way, the force exerted in a radial direction on the engagement sections can be counteracted, such that the pawl remains pivoted out.

In general, the idler gears are mounted in sliding fashion on the shaft, wherein the tooth tips of the internal toothing form the slide bearing arrangement. The gap between the engagement sections is in this case designed to receive a tooth tip of the internal toothing, such that a sliding surface of the slide bearing arrangement of the respective idler gear is received in the gap.

In a preferred embodiment, the pawls have in each case at least one sliding section which is designed to move the engagement section, in a second direction of rotation opposite the first direction of rotation, radially inward, and to rotate the pawl about a second axis of rotation.

In this way, in the pivoted-out state of the pawl, freewheeling of the idler gears can be realized with little technical outlay.

In a preferred embodiment, the spring element is designed such that, in an actuated state, it pivots the pawl outward about a second axis of rotation. Here, the engagement sections are pivoted radially outward.

In this way, the pawl can be reliably switched from a freewheeling state into an engagement state.

It is furthermore preferable if the actuating section is formed between the engagement section and the bearing surface.

In this way, the pawl can be actuated with little technical outlay and rotated about the engagement section in a freewheeling state.

It is furthermore preferable if the camshaft has circumferential grooves in which the actuating elements are guided in the axial direction.

In this way, the actuating elements can be mounted in the axial direction of the camshaft with little technical outlay, such that simple mounting of the actuating elements is possible.

In a preferred embodiment of the pawl, in each case one gap is formed between the engagement sections, such that a tooth of the internal toothing can engage into the gap.

In this way, twofold engagement of the pawl into the internal toothing can be realized, whereby a particularly uniform load distribution in the pawl is made possible.

It is furthermore preferable if the engagement sections are spaced apart such that they can be placed in engagement with in each case one tooth of the internal toothing.

In this way, the load can be distributed uniformly among the engagement sections.

It is furthermore preferable if the engagement sections are formed on the pawl such that the engagement sections can be simultaneously placed in engagement in each case with one tooth of the internal toothing during the pivoting-out of the pawl.

In this way, load peaks on one of the engagement sections can be avoided, because the load is distributed among multiple engagement sections simultaneously.

It is furthermore preferable if the first engagement section is formed on an end section of the pawl.

In this way, the pawl can be manufactured so as to be of particularly compact structural form.

It is furthermore preferable if the second engagement section is formed on a section between the first engagement section and the bearing section.

In this way, the engagement sections can engage into the internal toothing of the toothed gear and correspondingly transmit the load in the direction of rotation of the idler gear.

It is furthermore preferable if the engagement sections form surfaces on the pawl, which surfaces each have different inclinations.

In this way, one of the engagement sections can be used for the transmission of load of the idler gear, and the other engagement section can initiate a movement of the pawl, such that the pawl can be pivoted in under relatively high load.

It is furthermore preferable if the pawl is mounted on the shaft so as to be rotatable about an axis of rotation.

In this way, simple actuation of the pawl and simple pivoting-out of the pawl are possible.

It is furthermore preferable if the engagement surfaces sections form surfaces on the pawl, which surfaces in each case have different angles of inclination relative to a connecting plane between the respective engagement section and the axis of rotation. In particular, the connecting plane is a virtual connection between a central point of the respective engagement section or a point of contact of the respective engagement section with an internal toothing of the respective idler gear. The engagement sections are preferably of curved form, wherein here, the respective contact point has a corresponding angle of inclination with the internal toothing.

In this way, a relatively high load can be transmitted by one of the engagement sections, and the other of the engagement sections can be utilized for the pivoting-in of the pawl under load.

It is furthermore preferable if the first engagement section has a smaller angle of inclination than the second engagement section.

In this way, a relatively high torque can be exerted on the pawl by the second engagement section, such that the pawl can be pivoted in, and shifting can be correspondingly performed, under relatively high load.

It is furthermore preferable if the engagement sections have an angle of inclination of less than 90°.

In this way, it is generally possible for a force to be exerted on the engagement sections inward in a radial direction, such that the pawl can be pivoted in more easily under load.

It is furthermore preferable if the pawl has at least one sliding section which is formed on a rear-side section of at least one of the engagement sections, wherein the sliding section is designed such that the pawl is moved inward in a radial direction by the internal toothing of the respective idler gear in a second direction of rotation of the shaft counter to the first direction of rotation.

In this way, the pawl can be pivoted in easily in a direction of rotation opposite said one direction of rotation, such that a switch to a freewheel function is possible in a straightforward manner.

It is furthermore preferable if the at least one sliding section has an angle of inclination of greater than 60° relative to a connecting plane between the respective engagement section and the axis of rotation.

In this way, the pawl is pivoted inward only above a relatively high torque of the idler gear in the second direction, such that the pawl pivots in only in the event of a gearchange and not in the event of a mere decrease in drive force.

It is furthermore preferable if the pawl is preloaded radially outward, and the at least one sliding section inclined, such that, above a predefined torque exerted by the idler gear, the pawl pivots inward.

In this way, pivoting-in of the pawl in the event of a mere decrease in load without a gearchange can be prevented, such that, in the event of load being re-applied, an idle rotational angle of the idler gear on the shaft can be reduced.

Here, it is particularly preferable if the pawl is preloaded outward by way of a spring element and, by way of inclination of the sliding section, a torque threshold value is set which must be overcome by the idler gear in order to perform the freewheel function. In this way, with little technical outlay, the idle rotational angle in the event of load being applied without a gearchange can be reduced.

It is self-evident that the features mentioned above and the features yet to be discussed below may be used not only in the respectively specified combination but also in other combinations or individually without departing from the scope of the present invention.

BRIEF DESCRIPTION OF THE SEVERAL VIEWS OF THE DRAWING

Exemplary embodiments of the invention are illustrated in the drawing and will be discussed in more detail in the following description. In the drawing:

FIG. 4—is an exploded illustration of the shifting device;

FIG. 13—shows a schematic sectional view of the shifting device from FIG. 10 in an axial viewing direction in a further shifting position.

PREFERRED EMBODIMENTS

Figure 1:
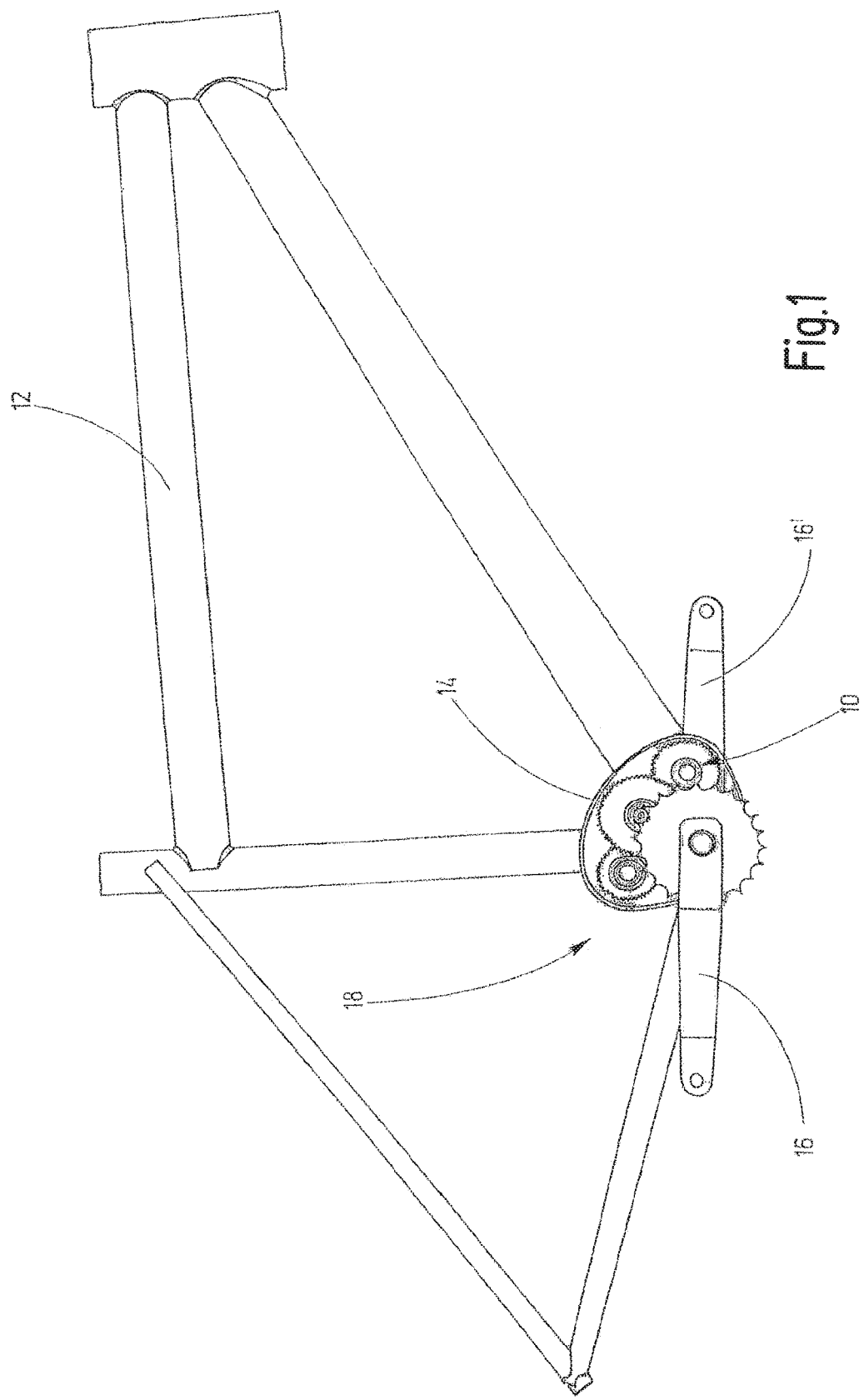
FIG. 1—shows a side view of a bicycle frame with a gearing unit.

In FIG. 1, a gearing unit is schematically illustrated and is denoted generally by 10.

FIG. 1 shows a side view of a bicycle frame 12 which has a gearing housing 14 in which the gearing unit 10 is accommodated. The gearing unit 10 is merely schematically indicated in this illustration and is in the form of a compact unit which is preferably arranged in a gearing cage (not illustrated here). The gearing unit is described herein by way of example for use in a bicycle, wherein it may however also be used in other vehicles operated using muscle force. It is self-evident that the gearing unit 10 may also be used for vehicles in which muscle force is used in combination with a drive machine for the purposes of driving the vehicle.

The gearing unit 10 and the gearing housing 14 form, together with pedal cranks 16, 16', a multi-speed gearing 18.

The gearing unit 10 has an input shaft and an output shaft. The input shaft is preferably in the form of a shaft extending all the way through, and is connected or connectable at its ends to the pedal cranks 16, 16' for the drive of the input shaft. The output shaft is preferably in the form of a hollow shaft and arranged coaxially with respect to the input shaft, wherein the output shaft is connected or connectable rotationally conjointly to a chain wheel, wherein the chain wheel forms an output element of the gearing unit.

The gearing unit 10 furthermore has a countershaft on which there is mounted a multiplicity of idler gears which, together with toothed gears of the input shaft and/or of the output shaft, form gear pairs in the form of a spur-gear gearing. Here, a multiplicity of idler gears of the countershaft together with a multiplicity of toothed gears of the input shaft may form a first gearing subsection, and a multiplicity of idler gears of the countershaft together with a multiplicity of toothed gears of the output shaft may form a second gearing subsection of the gearing unit 10.

The idler gears of the countershaft are, in one direction of rotation of the countershaft, connectable rotationally conjointly to the countershaft by way of switchable freewheels, wherein the switchable freewheels are actuable by way of a camshaft arranged in the countershaft in order to selectively connect the idler gears of the countershaft rotationally conjointly to the countershaft and thus set different gear-speed stages of the gearing unit 10.

The camshaft is rotatably mounted in the countershaft, wherein the camshaft rotates synchronously with the countershaft in order to maintain shifting states of the gearing unit and is rotated relative to the camshaft in order to change the shifting state, as will be discussed in more detail further below.

Normally, during the shifting process, two freewheels are actuated simultaneously, such that, in the event of an upshift, as a result of the relatively low rotational speed of the relatively high gear-speed stage, a load alteration occurs immediately upon the initiation of the shifting process, and upshifts can be performed under load. In the case of downshifts, for the load alteration, a decrease of the drive force is normally necessary in order to pivot the corresponding pawl in.

Figure 2:
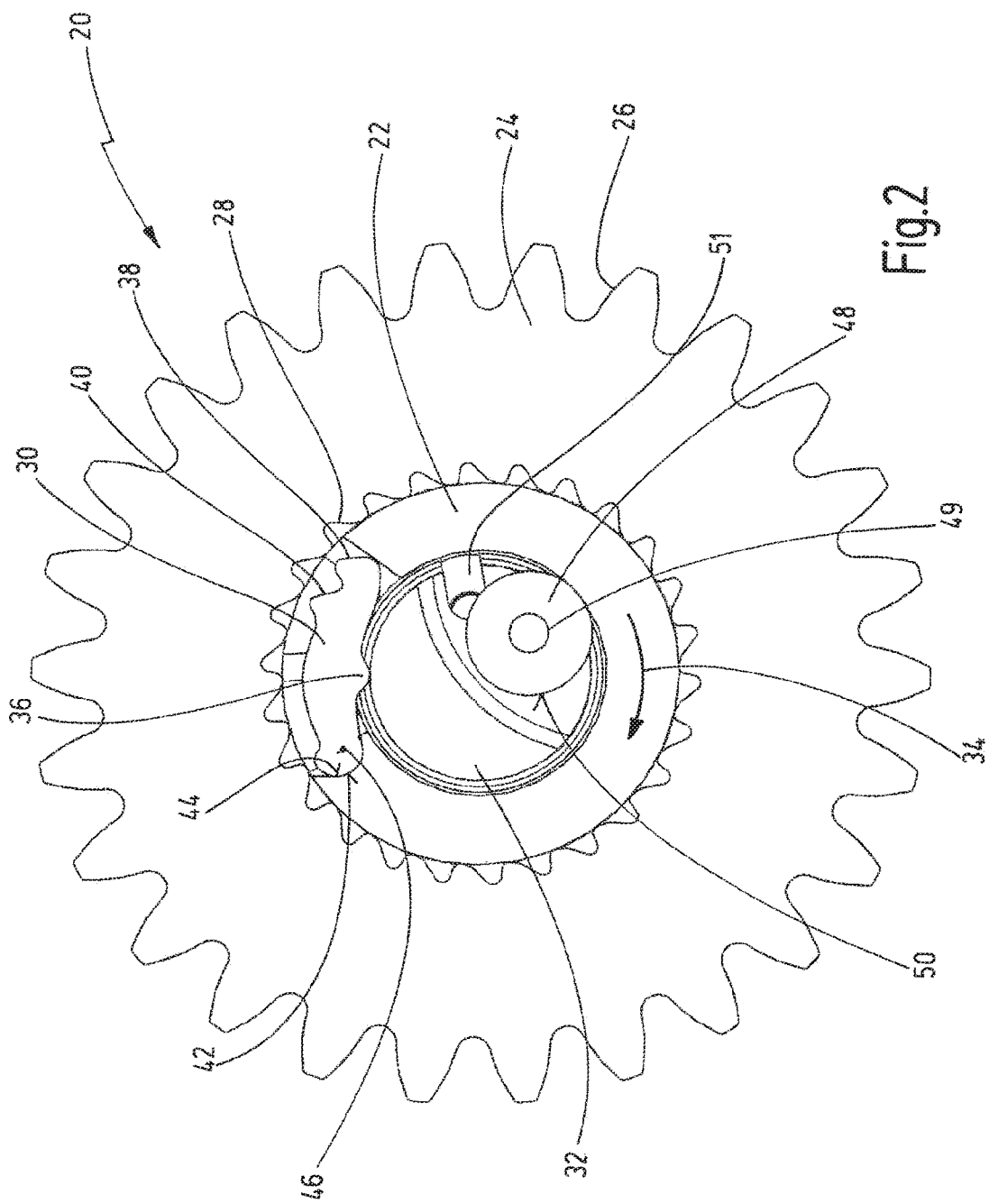
FIG. 2—shows a schematic sectional view of a shifting device in an axial viewing direction.

In FIG. 2, a shifting device for the shifting of idler gears is schematically illustrated and denoted generally by 20. The shifting device 20 has a shaft 22 which preferably corresponds to the countershaft of the gearing unit 10. On the shaft 22 there is mounted a multiplicity of idler gears, of which one idler gear 24 is illustrated in the axial viewing direction of FIG. 2. The idler gear 24 has an external toothing 26 which, together with a further toothed gear of the gearing unit 10, forms a gear pair and correspondingly a gear-speed stage of the gearing unit 10. The idler gear 24 furthermore has an internal toothing 28 into which a pawl 30 of the shifting device 20 can engage in order to connect the idler gear 24 rotationally conjointly to the shaft 22, as will be discussed in more detail further below.

In the shaft 22 there is rotatably mounted a camshaft 32 which actuates the pawls 30 in order to connect the respective idler gear 24 rotationally conjointly to the shaft 22. Here, the camshaft 32 is rotatably mounted coaxially in the shaft 22 and is connected to drive means (not illustrated here). The camshaft 32 is rotated synchronously with respect to the shaft 22 in order to maintain a set shifting state of the gearing unit 10 and is rotated relative to the shaft 22 in order to change a shifting state, as will be discussed in more detail further below.

The pawl 30 is mounted movably on the shaft 22 in order to be moved radially outward by the camshaft 32 and, in a direction of rotation 34 of the shaft 22, to connect the idler gear 24 rotationally conjointly to the shaft 22. The pawl 30 has an actuating section 36 which is formed so as to be elevated in a radially inward direction. The pawl 30 furthermore has engagement sections 38, 40 which are designed such that, in a pivoted-out state, they engage into the internal toothing 28 and correspondingly form a rotationally conjoint connection to the idler gear 24. On a side situated opposite the engagement sections 38, 40, the pawl 30 has a bearing surface 42 for the mounting or support of the pawl 30 on the shaft 22. On the shaft 22 there is formed a bearing section 44 on which the bearing surface 42 bears and is mounted such that the pawl 30 is mounted so as to be rotatable about a first axis of rotation 46.

The camshaft 32 has a cam element 48 or an actuating element 48 which is mounted movably or rotatably on the camshaft 32 and which is designed to move the pawl 30, by way of the actuating section 36, radially outward in order to cause the engagement sections 38, 40 to enter into engagement with the internal toothing 28. The actuating element 48 is in the form of a roller element 48 and has a circular bearing section 49 on which the actuating element 48 is rotatably mounted. The bearing section 49 and the actuating element 48 are preferably formed separately or in two parts, wherein the bearing section 49 is in the form of a bearing journal. The actuating element 48 has a circumferential surface 50 which, at one section, is arranged so as to be elevated in relation to the camshaft 32 and is designed to move the actuating section 36 radially outward and thereby correspondingly actuate the pawl 30. The cam element or the actuating element 48 is rotatably mounted in a groove 51 of the camshaft 32 by way of the bearing section 49. The bearing section 49 has a radius which is smaller than a radius of the circumferential surface 50. In this way, the circumferential surface 50 has a greater lever arm than the bearing section, such that a friction force on the bearing section 49 can be overcome more easily.

The engagement sections 38, 40 are designed and/or arranged in a radial direction, such that the engagement sections 38, 40 can be simultaneously placed in engagement in each case with one tooth of the internal toothing 28. The engagement sections 38, 40 have the same tooth pitch as the internal toothing 28. In this way, the force that acts on the pawl 30 can be distributed in a particularly effective and uniform manner, and load peaks can be avoided, because the engagement sections 38, 40 are simultaneously placed in engagement with in each case one tooth of the internal toothing 28.

In the rotational position of the camshaft 32 illustrated in FIG. 2, the actuating element 48 is not arranged on the actuating section 36 of the pawl 30, such that the pawl 30 has been rotated or pivoted radially inward about the axis of rotation 46, and the engagement sections 38, 40 are not in engagement with the internal toothing 28. The pawl 30 is furthermore assigned spring elements which move the pawl 30 radially inward, such that, in the state illustrated here, that is to say in the absence of actuation by the actuating element 48, the pawl 30 is not in engagement with the internal toothing 28, and the idler gear 24 is rotatable relative to the shaft 22 in both directions of rotation.

To actuate the pawl 30 and correspondingly move the actuating section 36 radially outward by way of the actuating element 48, the camshaft 32 is rotated relative to the shaft 22, such that the actuating element 48 is arranged on the actuating section 36, as will be discussed in more detail below.

Altogether, the pawl 30 may also, in a particular embodiment, have three or more engagement sections 38, 40. In this way, the force on the pawl 30 can be distributed even more uniformly.

Figure 3A:
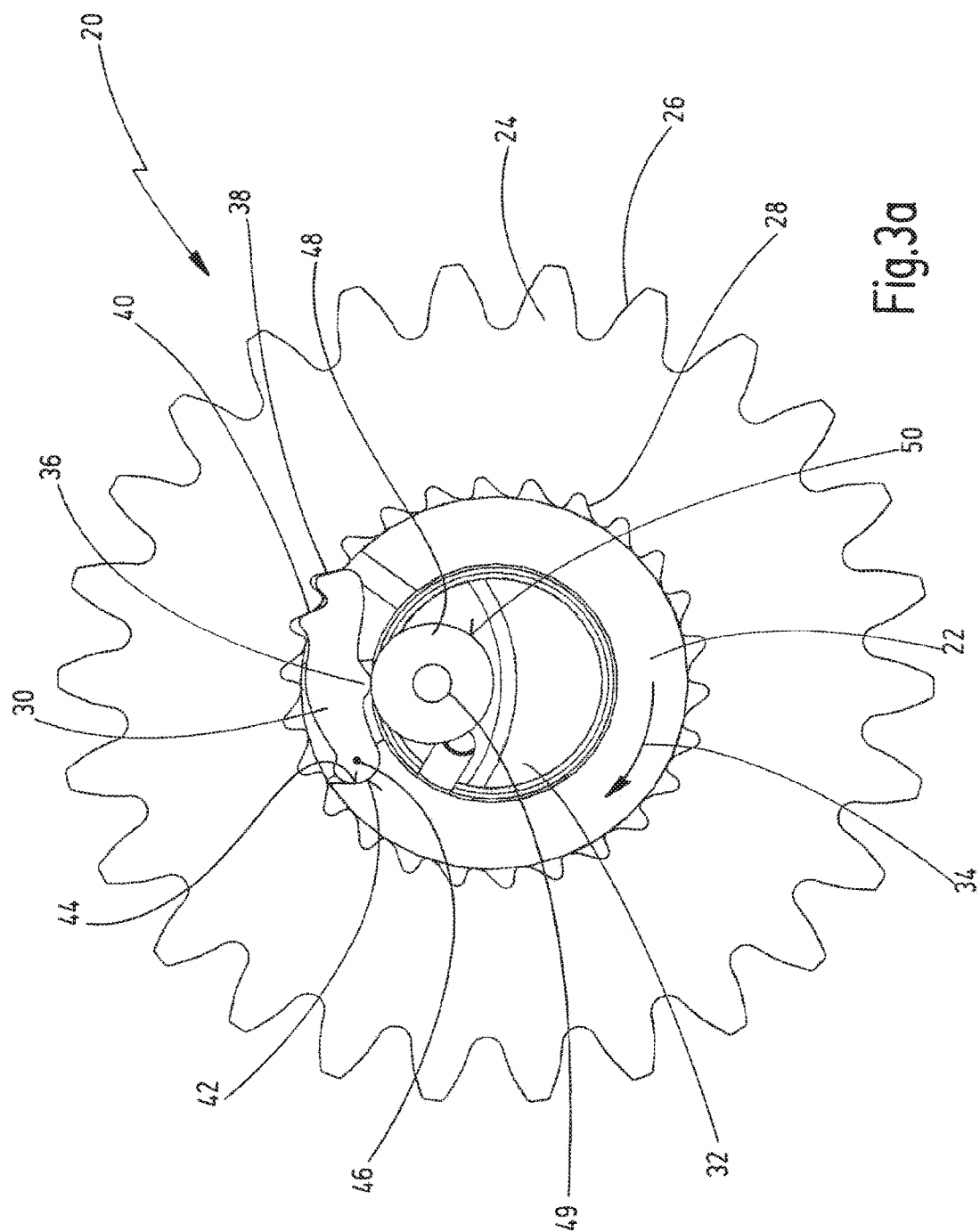
FIGS. 3*a*, *b*:—show a schematic sectional view, in an axial viewing direction, of the shifting device from FIG. 2 in different shifting positions.

FIG. 3a illustrates the shifting device from FIG. 2 in a different shifting position.

Identical elements are denoted by the same reference designations, wherein only the special features are discussed here.

In the rotational position of the camshaft 32 relative to the shaft 22 as illustrated in FIG. 3a, the movably mounted or rotatably mounted cam element 48 or actuating element 48 is arranged on the actuating section 36, such that the circumferential surface 50 moves the actuating section 36 radially outward and correspondingly actuates the pawl 30. In this way, the pawl 30 is rotated about the first axis of rotation 46, such that the engagement sections 38, 40 are placed in engagement with the internal toothing 28, and the shaft 22 is correspondingly connected rotationally conjointly to the idler gear 24. In said position of engagement, it is correspondingly possible, by way of the bearing surface 42 and the engagement sections 38, 40, for force to be transmitted in the direction of rotation 34 from the shaft 22 to the idler gear 24 and vice versa.

The engagement sections 38, 40 are formed so as to be inclined relative to a plane between the respective engagement section 38, 40 and the first axis of rotation 46, such that a normal force and a radial force are exerted on the engagement sections 38, 40, which radial force is directed in a radially inward direction. In this way, in said state of engagement, a force is permanently exerted on the engagement sections 38, 40, which force moves the engagement sections 38, 40 radially inward. Correspondingly, the bearing section 44 is of inclined form, such that a bearing force of the bearing surface 42 on the bearing section 44 exerts a normal force on the bearing surface 42 and simultaneously a radial force which moves the bearing surface 42 radially inward. The bearing section 44 and the engagement sections 38, 40 are inclined such that, in accordance with the lever ratios relative to the actuating section 36, the radial forces correspondingly cancel one another out. In this way, in said state of actuation or in said rotational position of the camshaft 32, the pawl 30 remains pivoted out, and the engagement sections 38, 40 remain in engagement with the internal toothing 28.

Owing to the inclination of the engagement sections 38, 40 and the resulting radial force that moves the engagement sections 38, 40 radially inward, the pawl 30 is pivoted out or disengaged from the internal toothing 28 if the cam element 48 or the actuating element 48 releases the actuating section 36. In this way, with the gearing unit 10, downshifts can be performed even under load, without a decrease in load or interruption in load having to be performed for the purposes of releasing the pawl 30.

Owing to the radial forces that are exerted on the engagement sections 38, 40 and the bearing surface 42 in each case in a radially inward direction, the actuating section 36 is pressed against the cam element 48 or the actuating element 48 with a high radial force. Owing to the rotatable mounting or owing to the movable mounting of the cam element 48 or of the actuating element 48, it is possible, despite the high friction force between the actuating section 36 and the circumferential surface 50 arising as a result of the high radial force, for the camshaft 32 to be rotated with little expenditure of force, and it is correspondingly also possible for shifting to be performed under load. Owing to the different radii or diameters of the bearing section 49 and of the circumferential surface 50, the camshaft can be rotated easily despite high radial forces.

Figure 3B:
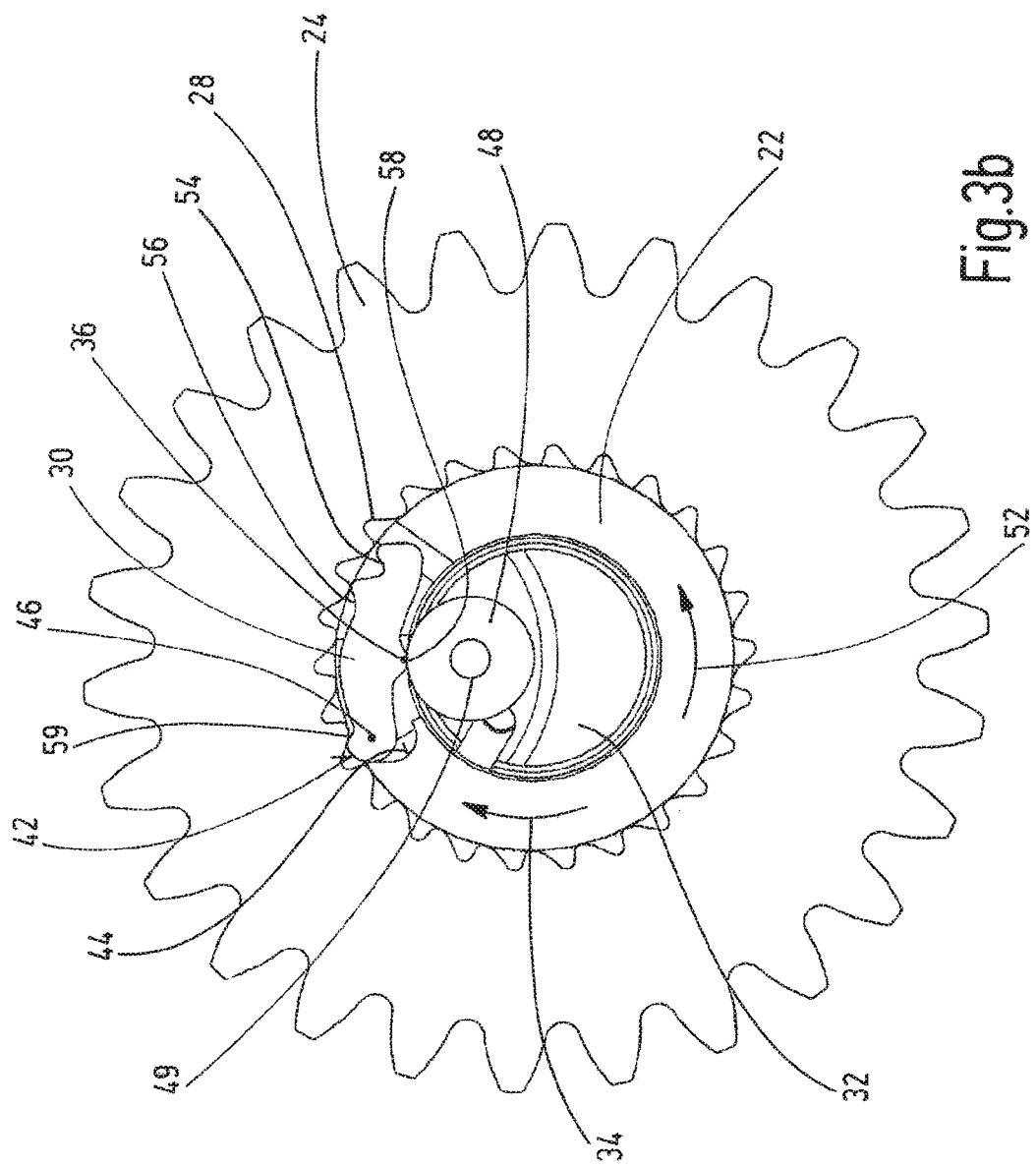

FIG. 3b schematically illustrates a freewheel function of the shifting device 20 from FIG. 2. Identical elements are denoted by the same reference designations, wherein only the special features are discussed here.

If the shaft 22 is rotated in a direction of rotation 52 counter to the direction of rotation 34, the pawl 30 is moved into a freewheel function, such that, in said direction of rotation 52, the idler gear 24 slides on the shaft 22. For this purpose, the pawl 30 has two sliding sections 54, 56 which are assigned to in each case one of the engagement sections 38, 40 and which are correspondingly formed on a rear-facing section. The sliding sections 54, 56 are designed such that, in a pivoted-out state of the pawl 30, the internal toothing 28 slides over the sliding sections 54, 56 and exerts a force on the sliding sections 54, 56 in a radially inward direction, such that the sliding sections 54, 56 are moved radially inward. For this freewheel function, the bearing surface 42 is movably mounted on the bearing section 44, such that the bearing surface 42 is, overall, moved radially outward. In this freewheel function or this freewheel movement, the entire pawl 30 is rotated about the actuating section 36, which in this freewheel function forms a second axis of rotation 58 of the pawl 30. A lateral movement in a circumferential direction of the shaft 22 is superposed on the rotational movement. In this situation, when the shaft 22 is rotated relative to the idler gear 24 in the opposite direction of rotation 52, the bearing surface 42 can be moved outward in a radial direction relative to the bearing section 44, because in this situation, no normal force is imparted by the engagement sections 38, 40, and the bearing surface 42 is correspondingly not pressed against the bearing section 44. This permits the rotation of the pawl 30 about the second axis of rotation 58, and a displacement or rolling of the actuating section 36 on the circumferential surface of the actuating element 48, such that the pawl 30 correspondingly has the freewheel function in the direction of rotation 52. In this situation, the spring element is supported on the inner circumferential surface of the shaft, such that the pawl 30 is rotated about the second axis of rotation 46 and the engagement sections 38, 40 are moved radially outward.

In the freewheel position, the pawl 30 performs an alternating tilting movement about the second axis of rotation 58, wherein a part of the bearing surface 42 pivots into the internal toothing 28 and, during the further rotation, is pivoted radially inward by the internal toothing 28, such that the two engagement sections 38, 40, or the two sliding sections 54, 56, are pivoted into the internal toothing. The sliding sections 54, 56 and the bearing surface 42 are spaced apart from one another such that either the bearing surface 42 or the sliding sections 54, 56 can pivot into the respective internal toothing 28. The bearing surface 42 is assigned a further sliding section 59 which is formed on a rear-side section of the bearing surface 42, such that, in the direction of rotation 34, the sliding section 59 and the bearing surface 42 are pushed in a radially inward direction and, correspondingly, in the direction of rotation 34, the engagement sections 38, 40 can engage into the internal toothing 28 and correspondingly form a rotationally conjoint connection between the shaft 22 and the idler gear 24. In this way, fast switching between a freewheeling state and a drive state is possible with a short idle travel.

The pawl 30 thus generally forms a freewheel body of a switchable freewheel.

Altogether, by way of the shifting device 20 with the switchable freewheels designed in this way, a gearing with capability for shifting under load can be provided, in the case of which upshifts can be performed under load and downshifts can be performed under load, wherein, by way of the rotation of the camshaft 32, the shifting process is possible with little expenditure of force.

FIG. 4 is an exploded illustration of the shifting device 20. The shaft 22 has a multiplicity of recesses 60 in which in each case one pawl 30 is mounted. The pawls 30 have, in each case in an axial direction of the shaft 22, two bearing journals 62, 64 on which there are mounted spring elements (not illustrated in any more detail here) which move the pawls 30 in a radially inward direction in order to disengage the pawls 30 from the internal toothing 28. The camshaft 32 has axial bearings 66 formed in a circumferential direction, between which axial bearings the cam elements 48 or the actuating elements 48 are arranged and are rotatably mounted in the radial grooves 51. The camshaft 32 with the axial bearings 66 can be produced with little technical outlay by way of a corresponding side milling cutter. As illustrated in FIG. 4, each of the pawls 30 is assigned an actuating element 48, such that, correspondingly, the idler gear associated with the respective pawl 30 can be connected rotationally conjointly to the shaft 22. Since the actuating elements 48 are mounted on the camshaft 32 at different circumferential positions or rotational positions, it is possible for individual idler gears 24 to be selectively connected rotationally conjointly to the shaft 22.

Figure 5:
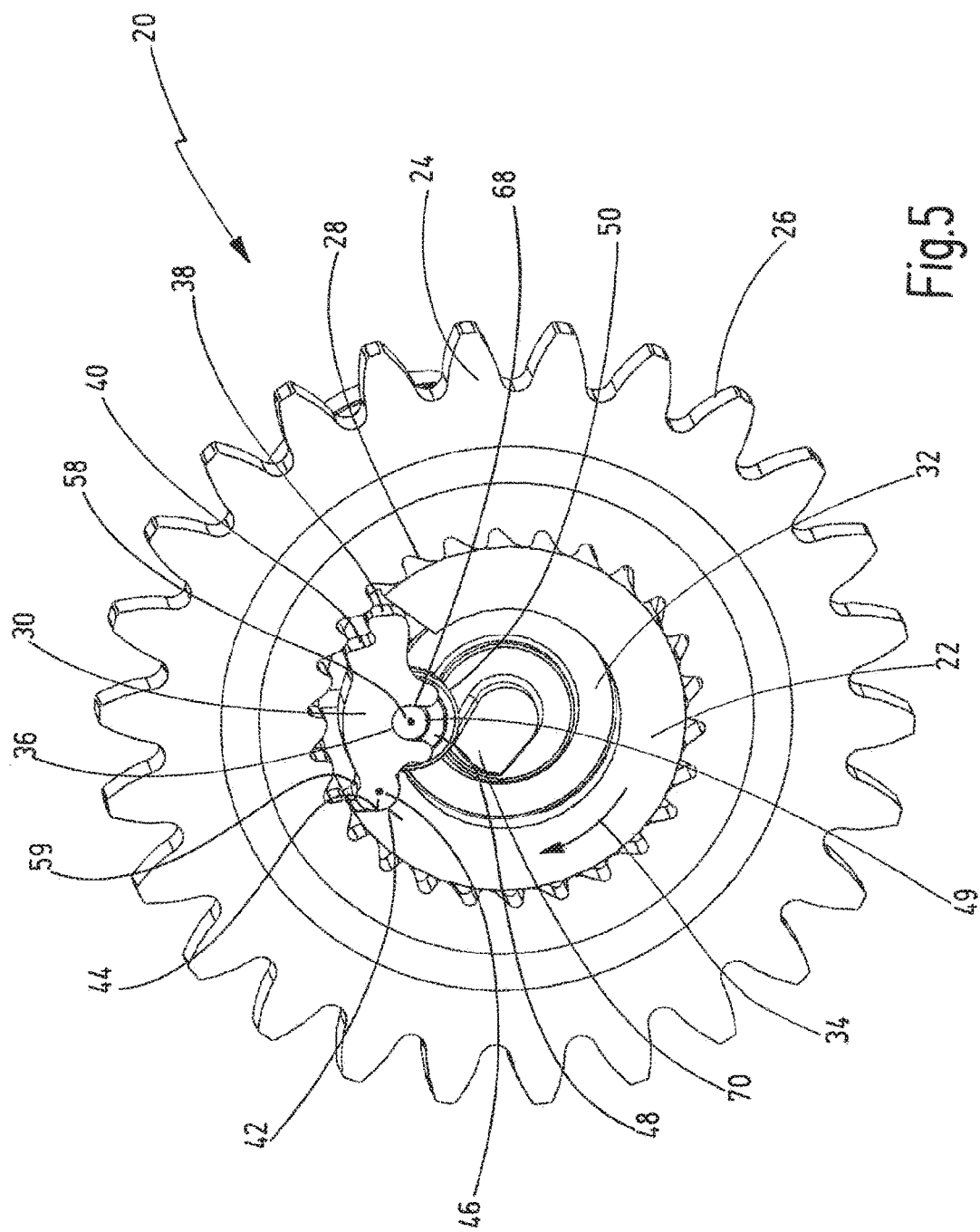
FIG. 5—is a schematic illustration of an alternative embodiment of the shifting device in an axial viewing direction, with an actuating element mounted on a pawl.

FIG. 5 illustrates an alternative embodiment of the mounting of the actuating element 48. Identical elements are denoted by the same reference designations, wherein only the special features are discussed here.

In this embodiment, the actuating element 48 is mounted rotatably on the pawl 30, wherein the circumferential surface 50 of the actuating element 48 rolls on the camshaft 32.

The actuating section 36 is assigned a receptacle 68 on which the actuating element 48 is rotatably mounted. In this specific embodiment, the receptacle 68 is formed by two projections, running in a radial direction, of the pawl 30. Between the projections there is formed a circular bearing section for receiving the bearing journals 49 of the actuating element 48 and for the corresponding rotatable mounting of the actuating element 48.

The circumferential surface 50 rolls on the camshaft 32 which, for the actuation of the actuating section 36 or for the actuation of the actuating element 48, has an elevated cam 70. The cam 70 causes the pawl 30 to be moved outward in a radial direction in order to place the engagement sections 38, 40 in engagement with the internal toothing 28, as has been discussed above.

In this embodiment, the second axis of rotation 58 is identical to the axis of rotation of the actuating element 48, wherein the pawl 30 is, in the freewheeling state, rotated about the second axis of rotation 58.

Figure 6:
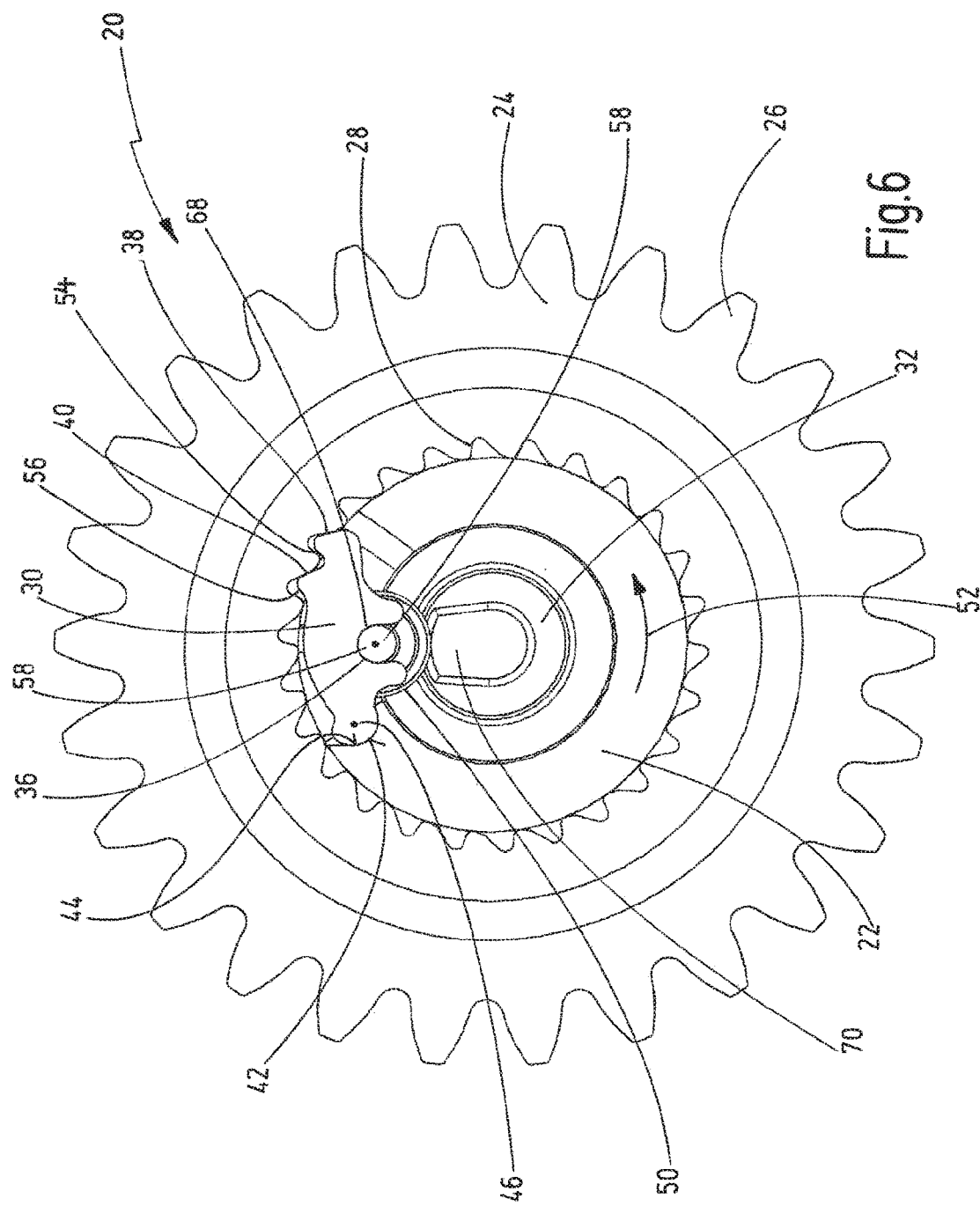
FIG. 6—is a schematic illustration of the shifting device from FIG. 5 in a different shifting position.

FIG. 6 illustrates the shifting device 20 from FIG. 5 in a position of actuation of the camshaft 32. Identical elements are denoted by the same reference designations, wherein only the special features are discussed here.

In the position of actuation illustrated here, the cam 70 of the camshaft 32 bears against the circumferential surface 50 of the actuating element 48, such that the actuating element 48 and thus the actuating section 36 are moved radially outward, the pawl 30 is rotated about the first axis of rotation 46, and correspondingly, the engagement sections 38, 40 are placed in engagement with the internal toothing 28. In said position, the pawl 30 can, if the shaft 22 is rotated in the direction of rotation 52 relative to the idler gear 24, be switched into the freewheel function in which the pawl 30 is rotated, or rocks back and forth, about the second axis of rotation 58.

Said embodiment, in which the actuating element 48 is rotatably mounted on the pawl 30, has the advantage that the pivoting-out of the pawl 30 can be controlled in a precise manner by way of particular contours of the cam 70, such that the shifting of the shifting device 20 can be set in a precise manner, and multiple gearing subsections can be coordinated with one another in a more precise manner.

Figure 7:
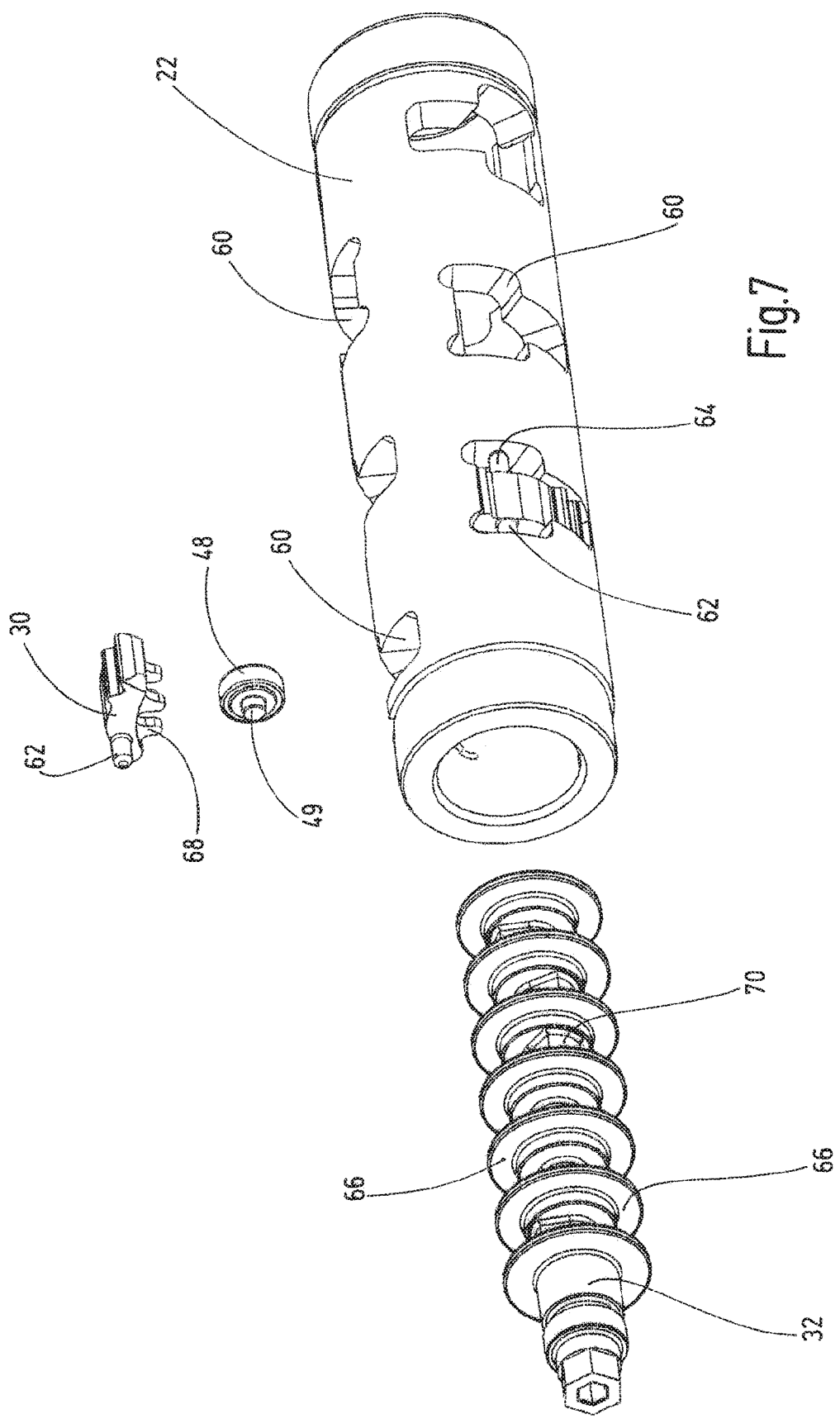
FIG. 7—is an exploded illustration of the shifting device from FIG. 5.

FIG. 7 is an exploded illustration of the shifting device 20 from FIG. 5. Identical elements are denoted by the same reference designations, wherein only the special features are discussed here.

In the shaft 22 there are formed the recesses 60 in which in each case one of the pawls 30 is mounted. The pawls 30 each have the receptacle 68 in which the bearing journals of the actuating element 48 are mounted for the purposes of rotatably mounting the actuating element 48 on the pawl 30. The camshaft 32 has the axial bearings 66, between which the cams 70 for the actuation of the actuating elements 48 are formed. The axial bearings 66 correspondingly serve for the mounting of the actuating elements 48 in an axial direction.

Figure 8:
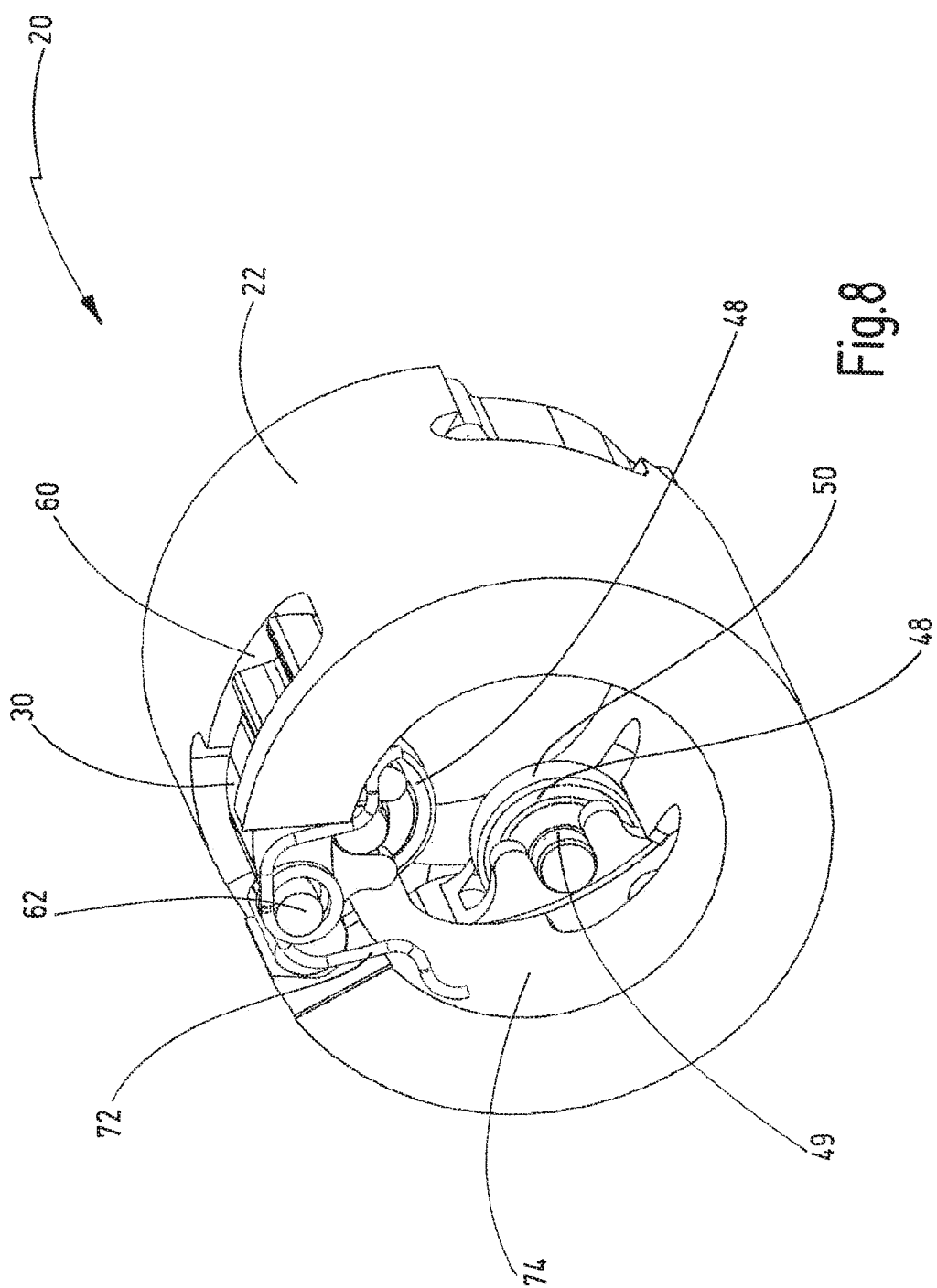
FIG. 8—is a perspective detail view of the shifting device from FIG. 5.

FIG. 8 illustrates a perspective sectional view of the shifting device 20. Identical elements are denoted by the same reference designations, wherein only the special features are discussed here.

The pawls 30, on which in each case one of the actuating elements 48 is rotatably mounted, are received in the receptacles 60 of the shaft 22. On the bearing journals 62, 64 there is mounted in each case one spring element 72 which is supported on an inner circumferential surface 74 of the shaft 22 and which correspondingly moves the pawls 30 radially inward. In this way, it is ensured that the engagement sections 38, 40 are reliably pivoted out of the internal toothing 28, such that the shifting device 20 can generally perform reliable gearchanges. The bearing journals 62, 64 are in this case arranged between the actuating element 48, or the actuating section 36, and the axis of rotation 46 as viewed in the circumferential direction of the shaft 22 or in the direction of rotation of the shaft 22, in order that the pawl 30 can pivot out and be recessed in the shaft.

Figure 9:
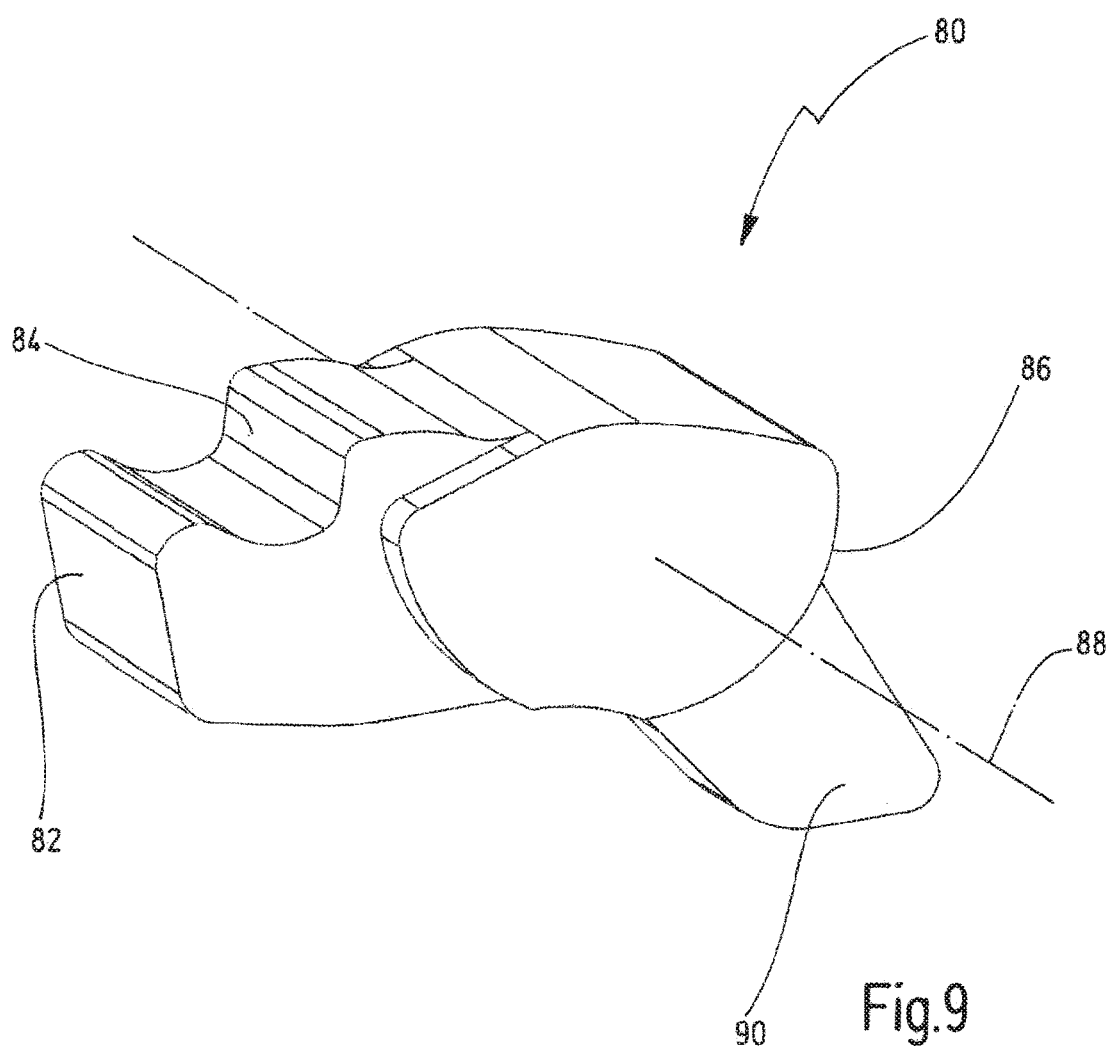
FIG. 9—shows a schematic perspective view of a pawl with two engagement sections.

In FIG. 9, a pawl for a shifting device of a gearing unit is illustrated in a perspective view and is denoted generally by 80. The pawl 80 has a first engagement section 82 and a second engagement section 84 which are spaced apart from one another and which are designed to be placed in engagement with an internal toothing of an idler gear. The engagement sections 82, 84 are spaced apart from one another such that they can be placed in engagement with different teeth of an internal toothing and such that a tooth tip of the internal toothing 28 can be arranged in the intermediate space or the gap between the engagement sections and, in the second direction of rotation 52, a sliding surface on the tooth tip of the internal toothing 28 can move the pawls 30 into the freewheel function. The pawl 80 furthermore has a bearing section 86 which is formed opposite the engagement sections 82, 84 and which serves for the mounting of the pawl 80 such that it is rotatable about an axis of rotation 88. The pawl 80 furthermore has an actuating section 90, which is formed so as to be spaced apart from the bearing section 86 and from the engagement sections 82, 84, for the purposes of correspondingly actuating the pawl 80 and rotating it about the axis of rotation 88. The pawl 80 serves generally as a freewheel body for a switchable freewheel of a shifting device for a vehicle driven using muscle force, as illustrated in FIG. 1.

The engagement sections 82, 84 are arranged on the pawl 80 in a radial direction such that they can be simultaneously placed in engagement with in each case one tooth of the internal toothing 110. In this way, the force can be distributed on the pawl 80 in a particularly simultaneous manner, whereby load peaks are avoided.

Figure 10:
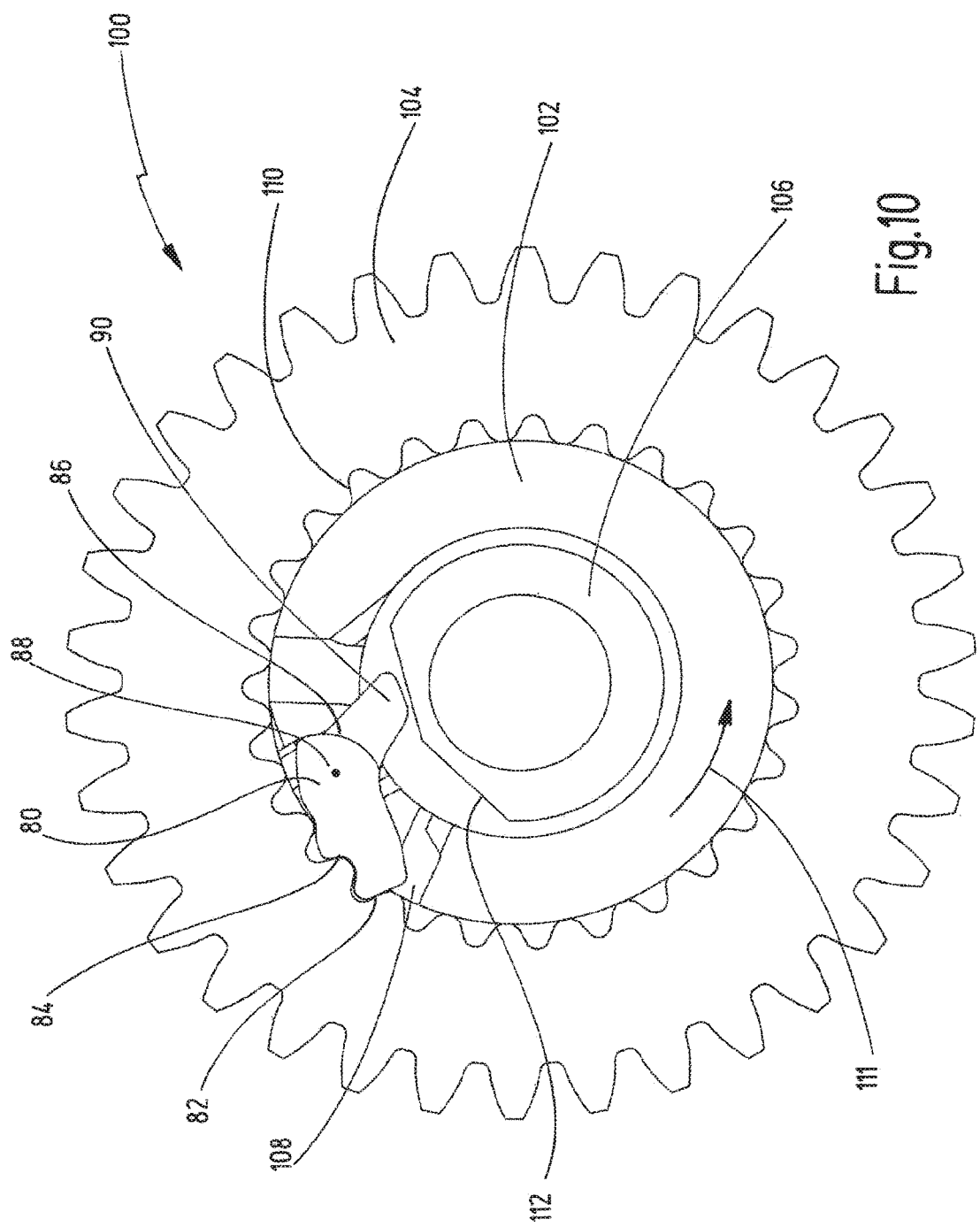
FIG. 10—shows a schematic sectional view of a shifting device in an axial viewing direction with the pawl from FIG. 9.

In FIG. 10, a shifting device with the pawl 80 is schematically illustrated and is denoted generally by 100. The shifting device 100 is of similar construction to the shifting device 20 and correspondingly has a shaft 102 on which an idler gear 104 is mounted. A camshaft 106 is mounted rotatably in the shaft 102 so as to be coaxial with respect to the shaft 102. On the shaft 102, the pawl 90 is rotatably or pivotably mounted, by way of the bearing section 86, in a recess 108. The idler gear 104 has the internal toothing 110, wherein, in the shifting position illustrated here, the engagement sections 82, 84 are in engagement with the internal toothing 110. In this shifting position, the pawl 80 forms a rotationally conjoint connection, in a direction of rotation 111 of the shaft 102, to the idler gear 104. By virtue of the fact that the pawl 80 has two engagement sections 82, 84, the force that is transmitted from the internal toothing 110 to the pawl 80 and vice versa can be distributed more effectively, such that it is possible to realize a more compact structural form and/or reduced wear of the individual components.

The camshaft 106 has a cam 112 which is formed as a recess relative to a circumferential surface of the camshaft 106, into which recess the actuating section 90 can pivot in order to pivot the actuating sections 82, 84 out.

The pawl 80 is assigned a spring element for pivoting the pawl 80 radially outward when the cam 112 is arranged on the actuating section 90 and in order to place the engagement sections 82, 84 reliably in engagement with the internal toothing 110.

In a particular embodiment, the pawl 80 has three or more engagement sections 82, 84, such that the force on the pawl 80 or the engagement sections can be distributed even more uniformly. Here, the engagement sections 82, 84 have the same tooth pitch as the internal toothing 110 in order to ensure a uniform distribution of the force.

By virtue of the fact that the pawl 80 has the two engagement sections 82, 84, the available area of contact with the internal toothing 110 can be enlarged, whereby the wear of and material load on the pawl 80 are reduced. Furthermore, the engagement sections 82, 84 may be dimensioned to be smaller, whereby it is possible to realize a larger number of teeth of the internal toothing 110, such that an idle rotational angle of the idler gear 104 relative to the shaft 106 is reduced.

Figure 11:
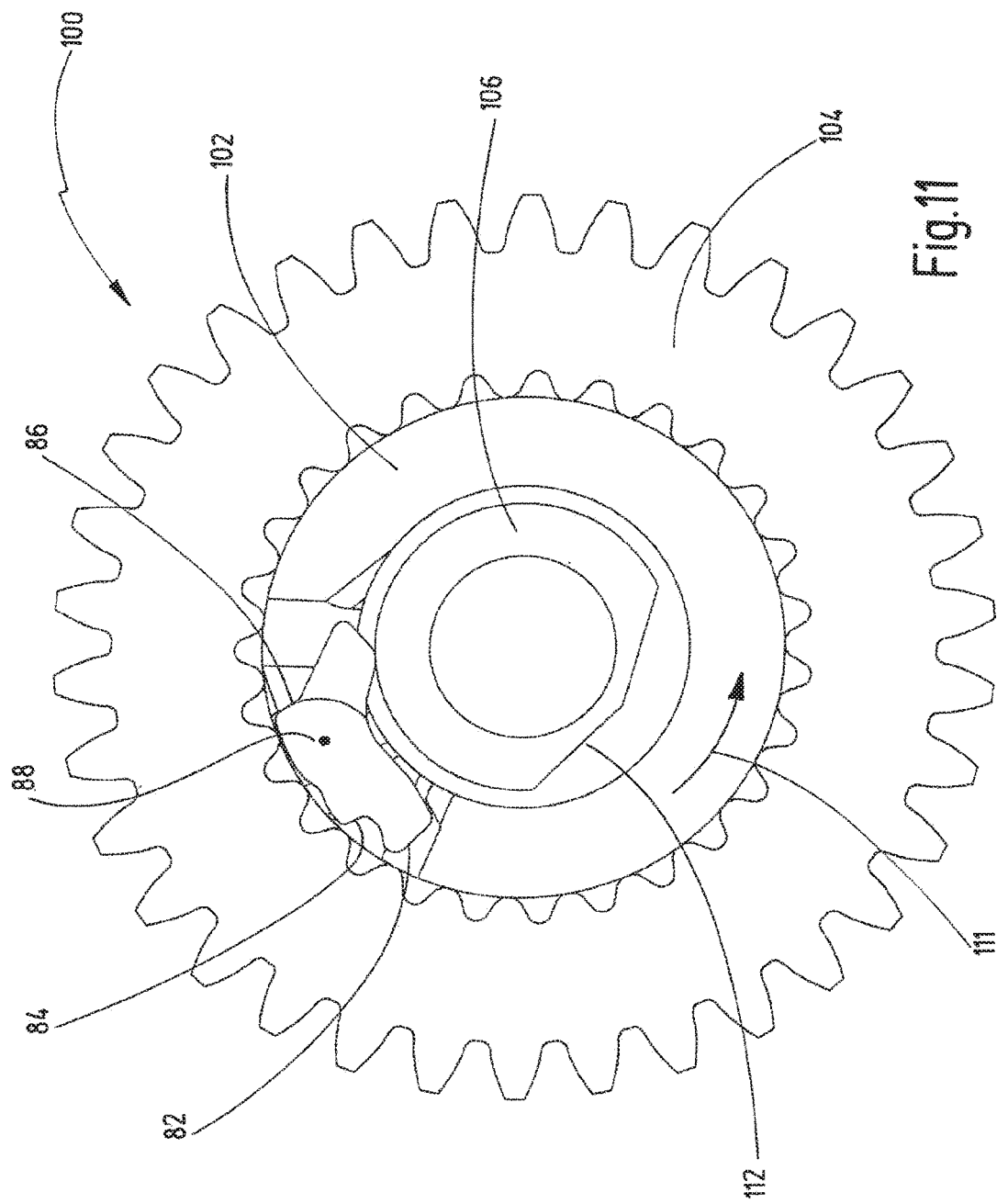
FIG. 11—shows a schematic sectional view of the shifting device from FIG. 10 in an axial viewing direction in another shifting position.

FIG. 11 illustrates a further shifting position of the shifting device 100. Identical elements are denoted by the same reference designations, wherein only the special features are discussed here.

The camshaft 106 has been rotated relative to the position in FIG. 10, such that the actuating section 90 has been moved radially outward and the engagement sections 82, 84 have been correspondingly pivoted in as a result of rotation of the pawl 80 about the axis of rotation 88. In this shifting position, the idler gear 104 slides on the shaft 102 in both directions of rotation. By contrast to the pawl 30 from FIGS. 2 to 8, the pawl 80 is pivoted in when the actuating section 90 is moved radially outward.

Here, a tooth of the internal toothing 104 with a sliding surface on the tooth tip projects into the gap between the engagement sections 82, 84 in order the pawl 80 can move radially inward in the freewheel direction and can initiate the freewheel function.

Figure 12:
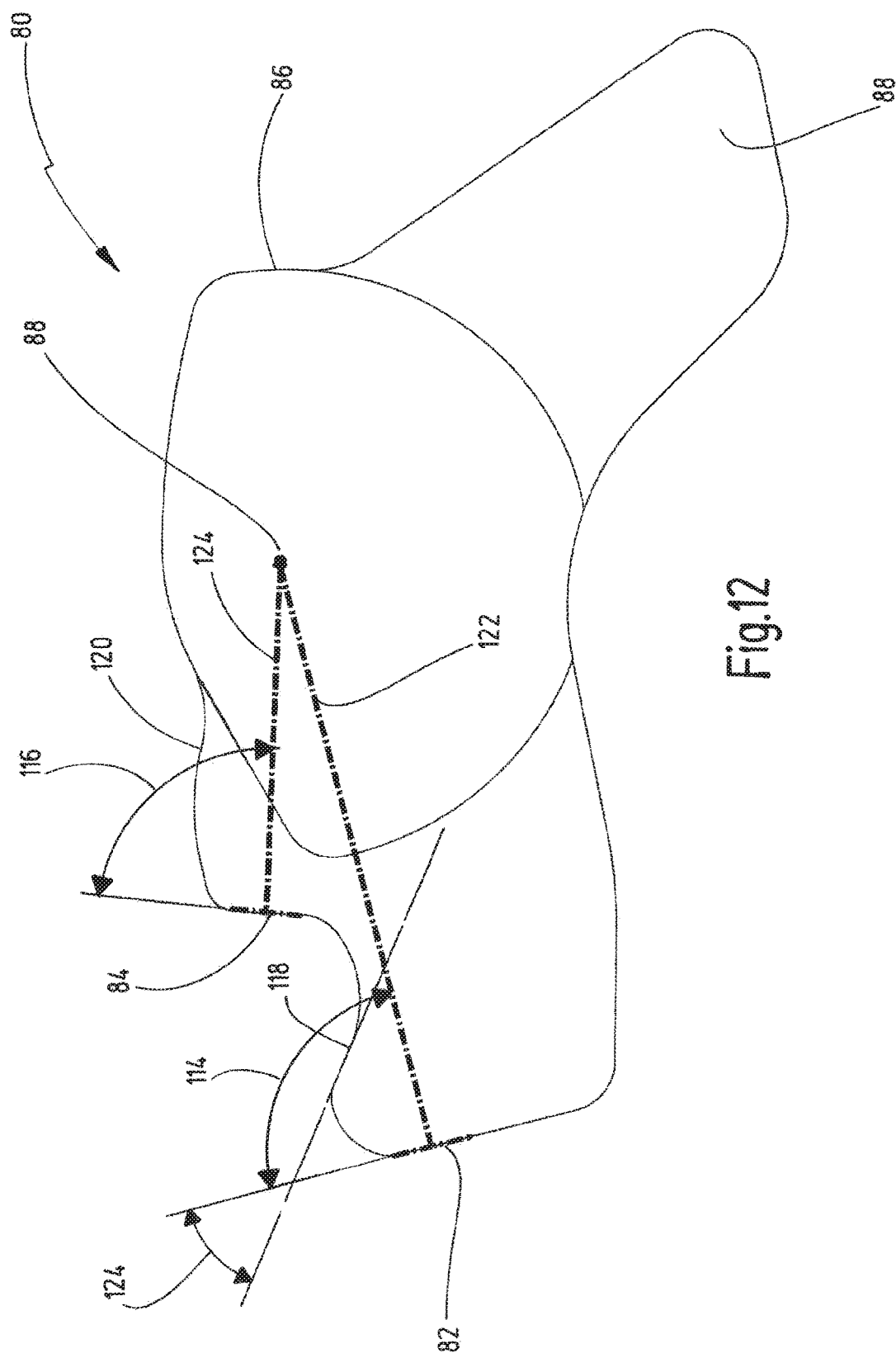
FIG. 12—shows a schematic side view of the pawl from FIG. 9 with differently inclined engagement sections.

FIG. 12 illustrates the pawl 80 in a schematic detail view. Identical elements are denoted by the same reference designations, wherein only the special features are discussed here.

The engagement sections 82, 84 are formed as surfaces and are formed so as to be inclined by an angle 114, 116 of less than 90° relative to a virtual connecting plane 122, 124 between a central point of the respective engagement section 82, 84, or between a contact point of the respective engagement section 82, 84, and the axis of rotation 88. In this way, in general, the pawl 80 can be pivoted inward more easily under load, because a low force is exerted on the engagement sections 82, 84 in a radially inward direction.

In a preferred embodiment, the angle 116 of the second engagement section 84 is greater than the angle 114 of the first engagement section 82. For example, the angle 116 is 80°, and the angle 114 is 70°. In this way, the first engagement section 82 can be used for the transmission of load, and the second engagement section 84 can assist the movement of the pawl 80 during the pivoting-in under load.

By way of the different angles 114, 116, it is the case that, during the pivoting of the pawl 80 outward, the first engagement section 82 is relieved of load and the second engagement section 84, with the better lever ratio, bears the main load. When the pawl 30 has been pivoted fully out, the first engagement section 82 additionally bears the load, because it is normally the case that lower loads act during shifting than during driving in a gear-speed stage.

The pawl 80 furthermore has two sliding sections 118, 120 which are formed in each case on a rear-side section in relation to the engagement sections 82, 84.

The sliding sections 118, 120 serve for pivoting the pawl 80 in when the idler gear 104 is rotated in the freewheel direction, counter to the direction of rotation 111, relative to the shaft 102. Here, the sliding sections 18, 20 are inclined such that a predefined torque must be exceeded in order to pivot the pawl 80 in, the pawl being preloaded outward by the spring element. Said predefined torque is preferably set to be so high that it is greater than a torque required for jointly rotating the drive output of the gearing unit 10 in the drive direction. In this way, the pawl 80 remains in engagement with the internal toothing 110 when no gearchange is being performed, such that no idle rotational angle arises in the event of a resumption of the transmission of load.

Here, an angle of inclination 126 of at least one of the sliding sections 118, 120 relative to the connecting plane 122 between the corresponding engagement section 82 and the axis of rotation 88 has an angle of greater than 60°. In other words, at least one of the sliding sections 118, 120 has an angle of less than 30° relative to the respectively associated engagement section 82, 84. As a result, the pawl 80 remains pivoted out for longer, and is pivoted in only during a shifting process or in the presence of a correspondingly high torque in the freewheel direction. In this way, an idle travel in the event of a decrease in drive force can be reduced or eliminated.

A further shifting position of the shifting device 100 is illustrated in FIG. 13. Identical elements are denoted by the same reference designations, wherein only the special features are discussed here.

In the rotational position of the pawl 80 illustrated here, the situation is illustrated in which the engagement sections 82, 84 are just being placed in engagement with in each case one tooth of the internal toothing 110. In this situation or in this rotational position, the tips of the engagement sections 82, 84 lie on a circular path formed by the tooth tips of the internal toothing 110. In other words, the engagement sections 82, 84 are arranged offset on the pawl 80 in a radial direction such that they simultaneously engage, during the pivoting-out, on the respective teeth of the internal toothing. In this way, the engagement sections 82, 84 are placed in contact simultaneously with in each case one tooth of the internal toothing 110, such that the force can be transmitted from the idler gear 104 to the pawl 80 in a particularly uniform and simultaneous manner.

It is self-evident that the geometrical characteristics of the engagement sections 82, 84, in particular the angles of inclination of the engagement sections 82, 84 of the pawl 80, also apply or are applicable to the engagement sections 38, 40 of the pawl 30. Here, the axis of rotation 88 corresponds to the first axis of rotation 46.

The invention claimed is:

1. A shifting device for a gearing unit, having:
    a shaft for the mounting of a multiplicity of idler gears, the shaft being mounted for rotation in a first direction and in an opposite second direction,
    a multiplicity of pawls which are assigned to the idler gears and which are movably mounted on the shaft in order to connect the idler gears rotationally conjointly to the shaft in the first direction of rotation,
    a camshaft which is assigned to the pawls and which is configured to set different gear-speed stages of the gearing unit,
    wherein one actuating element is assigned to each of the pawls, each actuating element being mounted on one of the assigned pawl and the camshaft so as to be movable relative to the camshaft and relative to the respective pawl, respectively, so as to actuate the pawl for the purposes of setting the gear-speed stages,
    wherein the camshaft is arranged so as to be concentric to the shaft for mounting the multiplicity of idler gears,
    wherein the actuating elements are rotatably mounted, and
    wherein each of the actuating elements has one rolling body with a circumferential surface, which rolling bodies roll on the camshaft or on the respective pawl, respectively.

2. The shifting device as claimed in claim 1, wherein the actuating elements have at least one bearing section on which they are rotatably mounted, wherein a radius of the bearing section is smaller than a radius of the circumferential surface.

3. The shifting device as claimed in claim 1, wherein the actuating elements are in the form of roller elements which are rotatably mounted by way of a bearing journal, wherein the roller elements and the respectively associated bearing journals are formed separately.

4. The shifting device as claimed in claim 1, wherein each of the actuating elements and the camshaft are configured to move one actuating section of the pawl outward in a radial direction.

5. The shifting device as claimed in claim 1, wherein the pawls are assigned a spring element which is configured to move the pawls inward in a radial direction.

6. The shifting device as claimed in claim 5, wherein the spring elements are mounted on the respective pawl at an engagement point, wherein each engagement point is formed between the first axis of rotation and the actuating section in a circumferential direction of the shaft.

7. The shifting device as claimed in claim 1, wherein each of the pawls has at least one engagement section which is configured to connect the shaft rotationally conjointly to the respective idler gear in said first direction of rotation.

8. The shifting device as claimed in claim 7, wherein each of the pawls has a multiplicity of engagement sections between which there is formed a gap, such that a sliding surface of a tip of an internal toothing of the respective idler gear can engage into the gap.

9. The shifting device as claimed in claim 7, wherein each of the engagement sections is of inclined form such that the respective idler gear, in said one direction of rotation, exerts a force inward in a radial direction on the respective pawl.

10. The shifting device as claimed in claim 1, wherein each of the pawls has a multiplicity of engagement sections which are configured such that each engagement section can be simultaneously placed in engagement with one tooth of an internal toothing of the respective idler gear.

11. The shifting device as claimed in claim 1, wherein the each of the pawls has one bearing surface, wherein each of the bearing surfaces is mounted on a bearing section of the shaft so as to be rotatable about an axis of rotation.

12. The shifting device as claimed in claim 11, wherein the bearing section is inclined such that, in said first direction of rotation, a force is exerted inward in a radial direction on the bearing surface of the pawl.

13. The shifting device as claimed in claim 11, wherein an actuating section is formed between an engagement section and each bearing surface.

14. The shifting device as claimed in claim 1, wherein the pawls have at least one sliding section which is configured to move an engagement section, in the second direction of rotation opposite to the first direction of rotation, radially inward, and to rotate the pawl about a second axis of rotation.

15. The shifting device as claimed in claim 1, wherein the spring element is configured such that, in an actuated state, it pivots the pawl outward about a second axis of rotation.

16. The shifting device as claimed in claim 1, wherein the camshaft has grooves in which the actuating elements are guided.

17. A shifting device for a gearing unit, having:
    a shaft for the mounting of a multiplicity of idler gears, the shaft being mounted for rotation in a first direction and in an opposite second direction,
    a multiplicity of pawls which are assigned to the idler gears and which are movably mounted on the shaft in order to connect the idler gears rotationally conjointly to the shaft in the first direction of rotation, and
    a camshaft which is assigned to the pawls and which is configured to set different gear-speed stages of the gearing unit,
    wherein each pawl has at least one engagement section which is configured to connect the shaft rotationally conjointly to the respective idler gear in said first direction of rotation by means of the engagement section engaging an internal toothing of an associated idler gear, wherein one actuating element is assigned to each of the pawls, wherein each actuating element is mounted on one of the assigned pawl and the camshaft so as to be movable relative to the camshaft and relative to the respective pawl, respectively, so as to actuate the pawl for the purposes of setting the gear-speed stages, wherein the actuating elements and the camshaft are configured to move an actuating section of the respective pawls outward in a radial direction, and wherein each of the engagement sections is of inclined form such that the respective idler gear, in said second direction of rotation, exerts a force inward in a radial direction on the respective pawl, so that owing to the inclination of the engagement sections and the resulting radial force that moves the engagement sections radially inward, the pawl is pivoted out or disengaged from the internal toothing when a cam element or the actuating element releases the actuating section.

18. A shifting device for a gearing unit, having:

a shaft for the mounting of a multiplicity of idler gears, the shaft being mounted for rotation in a first direction and in an opposite second direction, a multiplicity of pawls which are assigned to the idler gears and which are movably mounted on the shaft in order to connect the idler gears rotationally conjointly to the shaft in the first direction of rotation, and a camshaft which is assigned to the pawls and which is configured to set different gear-speed stages of the gearing unit, wherein each pawl has a multiplicity of engagement sections which are configured to connect the shaft rotationally conjointly to the respective idler gear in said first direction of rotation and which are configured such that each engagement section can be simultaneously placed in engagement with one tooth of an internal toothing of the respective idler gear, wherein the multiplicity of pawls are pivotably mounted around a rotation axis, wherein each of the pawls has precisely two engagement sections, wherein the two engagement sections are formed as surfaces that are inclined by respective angles of less than 900 relative to a virtual plane between a central point of the respective engagement section and the rotation axis of the respective pawl, and wherein the angles of the engagement sections are different.

19. A shifting device for a gearing unit, having:

a shaft for the mounting of a multiplicity of idler gears, the shaft being mounted for rotation in a first direction and in an opposite second direction, a multiplicity of pawls which are assigned to the idler gears and which are movably mounted on the shaft in order to connect the idler gears rotationally conjointly to the shaft in the first direction of rotation, and a camshaft which is assigned to the pawls and which is designed to set different gear-speed stages of the gearing unit, wherein one actuating element is assigned to each of the pawls, wherein each actuating element is mounted on one of the assigned pawl and the camshaft so as to be movable relative to the camshaft and relative to the respective pawl, respectively, so as to actuate the pawl for the purposes of setting the gear-speed stages, wherein each pawl has at least one engagement section which is configured to connect the shaft rotationally conjointly to the respective idler gear in said first direction of rotation, wherein each engagement section is of inclined form such that the respective idler gear, in said first direction of rotation, exerts a force inward in a radial direction on the respective pawl, wherein each pawl has one bearing surface, wherein each bearing surface is mounted on a bearing section of the shaft so as to be rotatable about an axis of rotation, and wherein the bearing section is inclined such that, in said first direction of rotation, a force is exerted inward in a radial direction on the bearing surface of the pawl.

20. A shifting device for a gearing unit, comprising:

a shaft configured for rotation in a first direction about a shaft axis and in an opposite second direction about the shaft axis, a plurality of idler gears mounted on the shaft, a plurality of pawls movably mounted on the shaft, each of the pawls being configured to connect one of the idler gears rotationally conjointly to the shaft in the first direction of rotation, a camshaft coaxial with the shaft and configured to set different gear-speed stages of the gearing unit, and a plurality of actuating elements, each actuating element being movable relative to the camshaft and relative to one of the pawls, wherein each actuating element comprises a roller that is rotatable about a rotational axis different from the shaft axis, and wherein each actuating element is configured to actuate the respective pawl at a different angular position of the camshaft to thereby set the gearing unit to one of the gear-speed stages.

* * * * *